(12) United States Patent
Hsieh et al.

(10) Patent No.: US 12,411,400 B2
(45) Date of Patent: Sep. 9, 2025

(54) INTERACTIVE REAR PROJECTION SYSTEM

(71) Applicant: Coretronic Corporation, Hsin-Chu (TW)

(72) Inventors: Ching-Feng Hsieh, Hsin-Chu (TW); Chih-Chen Chen, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 356 days.

(21) Appl. No.: 18/072,727

(22) Filed: Dec. 1, 2022

(65) Prior Publication Data

US 2023/0185178 A1    Jun. 15, 2023

(30) Foreign Application Priority Data

Dec. 13, 2021 (CN) .......................... 202111514366.7

(51) Int. Cl.
  *G03B 21/56* (2006.01)
  *G03B 21/10* (2006.01)

(52) U.S. Cl.
  CPC ............. *G03B 21/56* (2013.01); *G03B 21/10* (2013.01)

(58) Field of Classification Search
  CPC ........ G03B 21/10; G03B 21/26; G03B 21/28; G03B 21/56; G03B 21/2013; G03B 21/2033; G03B 21/2053; G03B 21/2066; G03B 17/00; G03B 17/54
  See application file for complete search history.

(56) References Cited

U.S. PATENT DOCUMENTS

| | | | |
|---|---|---|---|
| 2011/0231796 A1* | 9/2011 | Vigil | G06F 3/04883 715/810 |
| 2016/0188122 A1* | 6/2016 | Capps | H04N 23/21 345/175 |
| 2016/0301900 A1* | 10/2016 | Liu | H04N 9/3194 |

(Continued)

FOREIGN PATENT DOCUMENTS

| | | |
|---|---|---|
| CN | 201489503 | 5/2010 |
| CN | 201765792 | 3/2011 |
| CN | 105260021 | 1/2016 |

(Continued)

OTHER PUBLICATIONS

"Office Action of China Counterpart Application", issued on May 30, 2025, p. 1-p. 9.

*Primary Examiner* — Sultan Chowdhury
(74) *Attorney, Agent, or Firm* — JCIPRNET

(57) ABSTRACT

An interactive rear projection system including a projection screen, a projection optical engine, an input device and a controller is provided. The projection optical engine emits a projection beam which is projected on the projection screen. The input device includes a sensor and a first light source both disposed on a first side of the projection screen. The controller is electrically connected to the projection optical engine, the sensor, and the first light source and controls the first light source to project a first beam toward the projection screen. When an object approaches a second side of the projection screen, the sensor senses a light spot generated by the first beam diffusely reflected by the object and recognizes a position of the object or a position where the object touches the projection screen according to the light spot.

10 Claims, 2 Drawing Sheets

(56) References Cited

U.S. PATENT DOCUMENTS

2018/0088447 A1\* 3/2018 Otani ..................... G03B 17/54
2020/0041258 A1\* 2/2020 Wang ..................... G06T 7/521

FOREIGN PATENT DOCUMENTS

| CN | 106054512 | 10/2016 |
| CN | 109117026 | 1/2019 |
| TW | 200734889 | 9/2007 |
| TW | 201234236 | 8/2012 |

\* cited by examiner

INTERACTIVE REAR PROJECTION SYSTEM

CROSS-REFERENCE TO RELATED APPLICATION

This application claims the priority benefit of China application serial no. 202111514366.7, filed on Dec. 13, 2021. The entirety of the above-mentioned patent application is hereby incorporated by reference herein and made a part of this specification.

BACKGROUND

Technical Field

The invention relates to a rear projection system, and particularly relates to an interactive rear projection system.

Description of Related Art

A rear projection system has an optical engine, which projects an image beam to a reflector. The image beam is reflected by the reflector onto a projection screen disposed outside the optical engine but integrally connected thereto to display information.

However, currently, the design may display some messages in only a one-way manner for a user to read. When the user wants to input a message, it may probably be implemented through voice inquiry. However, if there are multiple results of the inquiry provided for the user to choose from, it is hard to choose what the user wants intuitively.

In another design, a layer of touch module is added to the projection screen of the rear projection system. However, once the size of the projection screen is increased, the cost of the touch module may greatly increase.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an interactive rear projection system, which is adapted to simply and intuitively provide a user with a good interaction effect at a low cost.

Other objects and advantages of the invention may be further illustrated by the technical features broadly embodied and described as follows.

In order to achieve one or a portion of or all of the objects or other objects, an embodiment of the invention provides an interactive rear projection system including a projection screen, a projection optical engine, an input device and a controller. The projection optical engine is configured to emit a projection beam, and the projection beam is projected on the projection screen. The input device includes a sensor and a first light source. The sensor and the first light source are both disposed on a first side of the projection screen. The controller is electrically connected to the projection optical engine, the sensor and the first light source. The controller is configured to control the first light source to project a first beam toward the projection screen. When an object approaches a second side of the projection screen, the sensor senses a light spot generated by the first beam diffusely reflected by the object, and recognizes a position of the object or a position where the object touches the projection screen according to the light spot.

In an embodiment of the invention, the sensor determines a position of the object in a two-dimensional direction parallel to the projection screen according to the light spot generated by the first beam diffusely reflected by the object.

In an embodiment of the invention, the first beam is infrared light, and the sensor is an infrared light sensor.

In an embodiment of the invention, a projection range of the first beam on an extension plane of the projection screen is greater than or equal to a size of the projection screen.

In an embodiment of the invention, the input device further includes a second light source. The second light source is disposed on the second side of the projection screen and is electrically connected to the controller. The controller is configured to control the second light source to project a second beam. When the object approaches the second side of the projection screen, the sensor senses a light spot generated by the second beam diffusely reflected by the object, and recognizes a position of the object in a direction perpendicular to the projection screen according to the light spot generated by the second beam.

In an embodiment of the invention, a projection range of the second beam is not overlapped with the projection screen.

In an embodiment of the invention, a projection range of the second beam is parallel to the projection screen.

In an embodiment of the invention, the second beam is an infrared planar beam.

In an embodiment of the invention, the interactive rear projection system further includes a reflector. The reflector is disposed on a transmission path of the projection beam between the projection optical engine and the projection screen.

In an embodiment of the invention, the controller is configured to identify the position of the object or the position where the object touches the projection screen and generates a refresh signal according to the same. The projection optical engine receives the refresh signal and refreshes the projection beam according to the refresh signal.

In an embodiment of the invention, the sensor and the first light source are disposed on a casing, and the input device further includes a second light source, where the projection screen is disposed between the sensor and the first light source and the second light source.

Based on the above description, in an embodiment of the invention, the interactive rear projection system is designed as that when an object approaches the second side of the projection screen, the sensor senses the light spot generated by the first beam diffusely reflected by the object, and recognizes the position of the object or the position where the object touches the projection screen according to the light spot. The interactive rear projection system may further refresh the projection beam according to the position of the object or the position where the object touches the projection screen, so as to achieve the interaction effect between the user and the projection system. Therefore, the interactive rear projection system of the embodiment of the invention may simply and intuitively provide the user with a good interaction effect without adding an additional touch module, which achieves a low cost effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
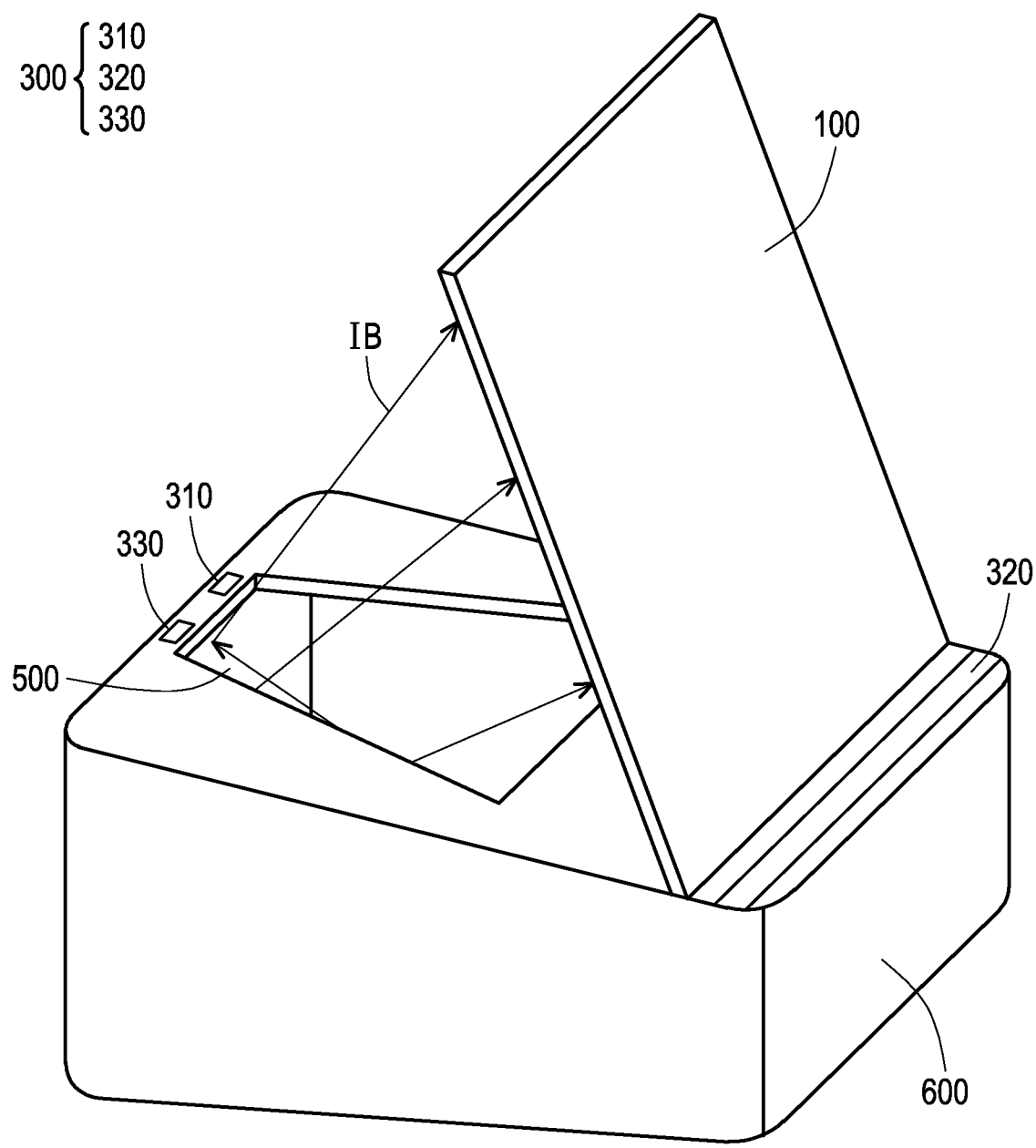
FIG. 1 is a three-dimensional schematic diagram of an interactive rear projection system according to an embodiment of the invention.
Figure 2:
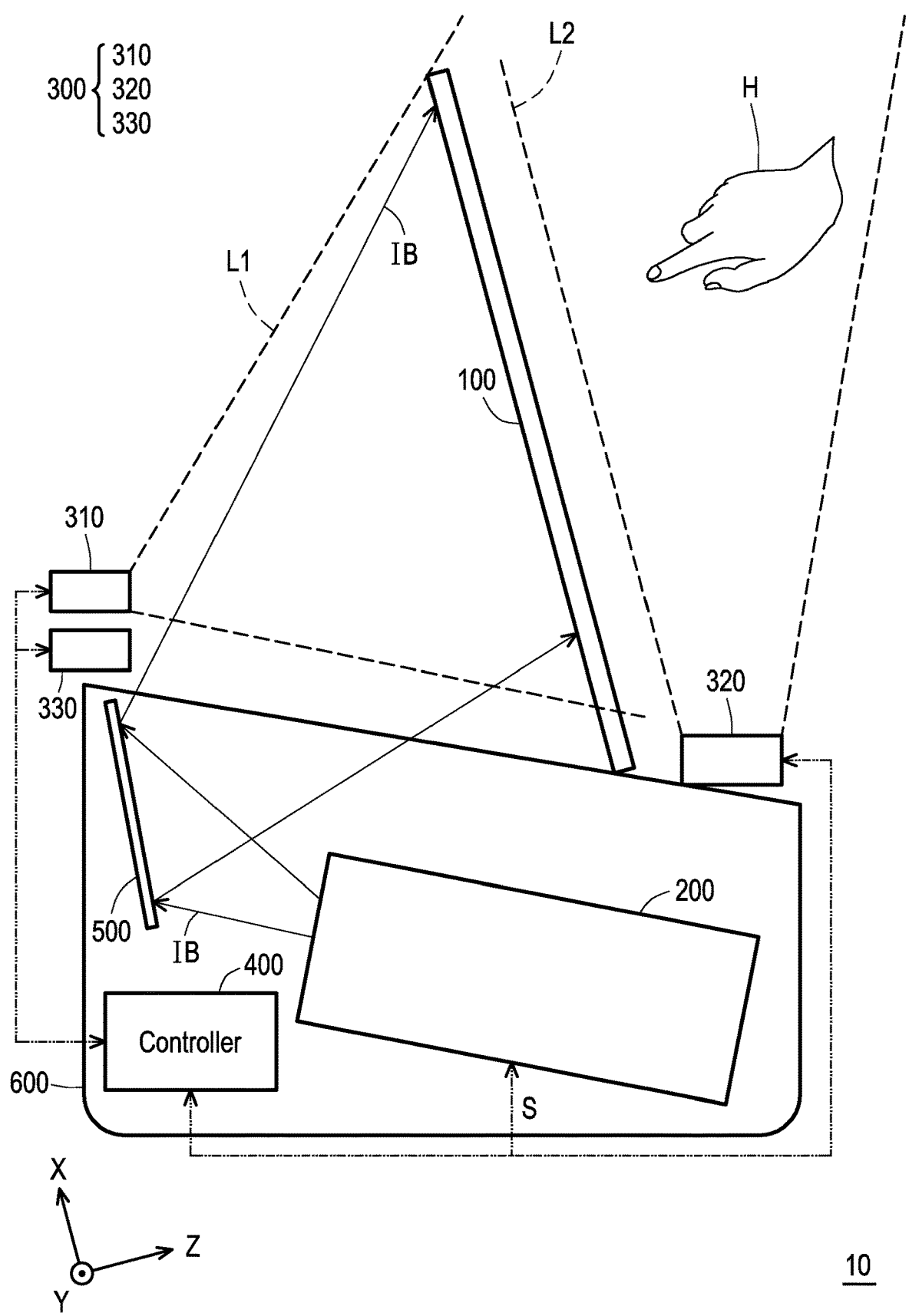
FIG. 2 is a schematic cross-sectional view of an interactive rear projection system according to an embodiment of the invention.

FIG. 1 is a three-dimensional schematic diagram of an interactive rear projection system according to an embodiment of the invention. FIG. 2 is a schematic cross-sectional view of an interactive rear projection system according to an embodiment of the invention. Referring to FIG. 1 and FIG. 2, an embodiment of the present invention provides an interactive rear projection system 10, which includes a projection screen 100, a projection optical engine 200, an input device 300 and a controller 400. The projection optical engine 200 is used to emit a projection beam IB, and the projection beam IB is projected on the projection screen 100. The projection beam IB may be a visible beam. A position where the projection optical engine 200 emits the projection beam IB and a position of the user are respectively located on two sides of the projection screen 100. In the embodiment, the position where the projection optical engine 200 emits the projection beam IB is embodied as a first side of the projection screen 100, and the position of the user is embodied as a second side of the projection screen 100. After the projection beam IB is projected on the projection screen 100, the user views an image through the light transmitted from the projection screen 100. In addition, a material of the projection screen 100 may be a polymer-dispersed liquid crystal display (PDLC display), and a light transmittance of the projection screen 100 may be adjusted according to the characteristics of the material thereof. However, the material of the projection screen 100 is not limited by the invention.

In the embodiment, the input device 300 includes a sensor 330 and a first light source 310. The sensor 330 may be an infrared light sensor. The first light source 310 may be an infrared light source, such as an infrared light-emitting diode or an infrared laser diode, but the invention is not limited thereto. The first light source 310 is configured to emit a first beam L1, where the first beam L1 may be infrared light.

In an embodiment, the interactive rear projection system 10 further includes a casing 600. The projection optical engine 200 and the controller 400 are disposed in the casing 600. The projection screen 100 is disposed on the casing 600. The sensor 330 and the first light source 310 are also disposed on the casing 600. In addition, the sensor 330 and the first light source 310 are both disposed on the first side of the projection screen 100. For example, the projection screen 100 is disposed at a front end of the casing 600, and the sensor 330 and the first light source 310 are disposed at a rear end of the casing 600. In order to preferably indicate that the first light source 310 projects the first beam L1 on the projection screen 100, the first light source 310 is illustrated above the sensor 330 along an X-axis direction in FIG. 2. However, a positional relationship between the sensor 330 and the first light source 310 is not limited by the embodiment.

In the embodiment, the controller 400 is electrically connected to the projection optical engine 200, the sensor 330, and the first light source 310. The controller 400 controls the first light source 310 to project the first beam L1 toward the projection screen 100, and the first beam L1 may penetrate through the projection screen 100. When the user approaches the second side of the projection screen 100 with an object H, the sensor 330 senses a light spot generated by the first beam L1 diffusely reflected by the object H, and recognizes a position of the object H or a position where the object H touches the projection screen 100 according to the light spot. Where, the object H may be any light-shielding object, such as a hand portion of the user.

In the embodiment, the sensor 330 determines a position of the object H in a two-dimensional direction parallel to the projection screen 100 according to the light spot generated by the first beam L1 diffusely reflected by the object H. The two-dimensional direction may be defined by any directions that are not parallel to each other on the projection screen 100, such as an X-axis direction and a Y-axis direction in FIG. 2. Moreover, the controller 400 identifies the position of the object H or the position where the object H touches the projection screen 100 and generates a refresh signal S according to the same. The projection optical engine 200 receives the refresh signal S and refreshes the projection beam IB according to the refresh signal S, and then projects the refreshed projection beam IB to the projection screen 100.

In an embodiment, the sensor 330 may use the position of the object H corresponding to the projection screen 100 as input coordinates of an input interface. For example, the controller 400 controls the projection optical engine 200 to not project a selection interface (not shown in the figure) to the projection screen 100, and the sensor 330 obtains input coordinates according to the light spot generated by the first beam L1 diffusely reflected by the object H, the controller 400 learns options corresponding to the above selection interface according to the above input coordinates, and then generates the refresh signal S to make the projection optical engine 200 to refresh the image projected on the projection screen 100.

In order to enable the interactive rear projection system 10 of the embodiment of the invention to have a better interaction effect, in the embodiment, a projection range of the first beam L1 on an extension plane of the projection screen 100 is greater than or equal to a size of the projection screen 100, so that the interactive rear projection system 10 may effectively sense the position of the object H in space.

Besides, the aforementioned controller 400 includes, for example, a microcontroller unit (MCU), a central processing unit (CPU), a microprocessor, a digital signal processor (DSP), a programmable controller, a programmable logic device (PLD) or other similar devices or a combination of these devices, which is not limited by the invention. In addition, in one embodiment, each function of the controller 400 may be implemented as a plurality of program codes. These program codes are stored in a memory, and the controller 400 executes the program codes. Alternatively, in an embodiment, each function of the controller 400 may be implemented as one or a plurality of circuits. The invention does not limit the use of software or hardware to implement the functions of the controller 400.

In an embodiment, the input device 300 further includes a second light source 320. The second light source 320 is disposed on the casing 600, and the projection screen 100 is disposed between the sensor 330 and the first light source 310 and the second light source 320. In other words, the second light source 320 is disposed on the other side of the projection screen 100 relative to the first light source 310. To be specific, the second light source 320 and the object H are both located on the second side of the projection screen 100. Similarly, the second light source 320 may be an infrared light source, such as an infrared light-emitting diode or an infrared laser diode, but the invention is not limited thereto. The second light source 320 is configured to emit a second beam L2, where the second beam L2 may be infrared light.

In addition, in an embodiment, the second light source 320 is electrically connected to the controller 400. The controller 400 controls the second light source 320 to project the second beam L2. When the object H approaches the second side of the projection screen 100, the sensor 330 senses a light spot generated by the second beam L2 diffusely reflected by the object H, and recognizes a position of the object H in a direction perpendicular to the projection screen 100 according to the light spot generated by the second beam L2. The direction perpendicular to the projection screen 100 is, for example, a Z-axis direction in FIG. 2. In this way, by using the sensor 330 to sense the light spots generated by the first beam L1 and the second beam L2 diffusely reflected by the object H, an effect of recognizing the position of the object H in a three-dimensional direction parallel to and perpendicular to the projection screen 100 may be achieved.

In an embodiment, the second beam L2 emitted by the second light source 320 is preferably designed as an infrared beam. For example, the second light source 320 is embodied as a light bar with a length greater than or equal to a length of the projection screen 100 in the Y-axis direction. Moreover, a projection range of the second beam L2 is not overlapped with the projection screen 100. In other words, the second beam L2 is not projected onto the projection screen 100 to avoid misjudgement of the sensor 330. In addition, in another embodiment, the projection range of the second beam L2 is parallel to the projection screen 100. To be specific, as shown in FIG. 2, in the projection range of the second beam L2, a planar beam on the side close to the projection screen 100 is parallel to the projection screen 100.

In another embodiment, the interactive rear projection system 10 further includes a reflector 500. The reflector 500 is disposed in the casing 600 and is disposed on the transmission path of the projection beam IB between the projection optical engine 200 and the projection screen 100. For example, the projection optical engine 200 is disposed at the front end in the casing 600, the reflector 500 is disposed at the rear end in the casing 600, and the projection screen 100 is disposed at the front end on the casing 600. The projection beam IB emitted by the projection optical engine 200 is first transmitted to the reflector 500, and the reflector 500 reflects the projection beam IB onto the projection screen 100.

In summary, in an embodiment of the invention, the interactive rear projection system includes the projection screen, the projection optical engine, the input device, and the controller. The controller controls the first light source to project the first beam toward the projection screen. When the object approaches the second side of the projection screen, the sensor senses the light spot generated by the first beam diffusely reflected by the object, and recognizes the position of the object or the position where the object touches the projection screen according to the light spot. Therefore, the interactive rear projection system may use the position of the object or the position where the object touches the projection screen as the input coordinates of the input interface, and further refresh the projection beam to achieve the interaction effect between the user and the projection system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An interactive rear projection system, comprising a projection optical engine, an input device, and a controller, wherein
   the projection optical engine is configured to emit a projection beam, and the projection beam is projected on a projection screen;
   the input device comprises a sensor and a first light source, and the sensor and the first light source are both disposed on a first side of the projection screen; and
   the controller is electrically connected to the projection optical engine, the sensor, and the first light source, and the controller is configured to control the first light source to project a first beam toward the projection screen, wherein when an object approaches a second side of the projection screen, the sensor is configured to sense a light spot generated by the first beam diffusely reflected by the object and the controller is configured to recognize a position of the object or a position where the object touches the projection screen according to the light spot,
   wherein the controller is configured to determine the position of the object in a two-dimensional direction parallel to the projection screen according to the light spot generated by the first beam diffusely reflected by the object.

2. The interactive rear projection system as claimed in claim 1, wherein the first beam is infrared light, and the sensor is an infrared light sensor.

3. The interactive rear projection system as claimed in claim 1, wherein a projection range of the first beam on an extension plane of the projection screen is greater than or equal to a size of the projection screen.

4. The interactive rear projection system as claimed in claim 1, further comprising a reflector disposed on a transmission path of the projection beam between the projection optical engine and the projection screen.

5. The interactive rear projection system as claimed in claim 1, wherein the sensor and the first light source are disposed on a casing, and the input device further comprises a second light source, wherein the projection screen is disposed between the sensor and the first light source and the second light source.

6. An interactive rear projection system, comprising a projection optical engine, an input device, and a controller, wherein
   the projection optical engine is configured to emit a projection beam, and the projection beam is projected on a projection screen;
   the input device comprises a sensor and a first light source, and the sensor and the first light source are both disposed on a first side of the projection screen; and
   the controller is electrically connected to the projection optical engine, the sensor, and the first light source, and the controller is configured to control the first light source to project a first beam toward the projection screen, wherein when an object approaches a second side of the projection screen, the sensor is configured to sense a light spot generated by the first beam diffusely reflected by the object and the controller is configured to recognize a position of the object or a position where the object touches the projection screen according to the light spot,
   wherein the input device further comprises a second light source, and the second light source is disposed on the second side of the projection screen and is electrically connected to the controller, wherein
   the controller is configured to control the second light source to project a second beam, and when the object approaches the second side of the projection screen, the sensor is configured to sense a light spot generated by the second beam diffusely reflected by the object and the controller is configured to recognize a position of the object in a direction perpendicular to the projection screen according to the light spot generated by the second beam diffusely reflected by the object.

7. The interactive rear projection system as claimed in claim 6, wherein a projection range of the second beam is not overlapped with the projection screen.

8. The interactive rear projection system as claimed in claim 6, wherein a projection range of the second beam is parallel to the projection screen.

9. The interactive rear projection system as claimed in claim 6, wherein the second beam is an infrared planar beam.

10. An interactive rear projection system, comprising a projection optical engine, an input device, and a controller, wherein
    the projection optical engine is configured to emit a projection beam, and the projection beam is projected on a projection screen;
    the input device comprises a sensor and a first light source, and the sensor and the first light source are both disposed on a first side of the projection screen; and
    the controller is electrically connected to the projection optical engine, the sensor, and the first light source, and the controller is configured to control the first light source to project a first beam toward the projection screen, wherein when an object approaches a second side of the projection screen, the sensor is configured to sense a light spot generated by the first beam diffusely reflected by the object and the controller is configured to recognize a position of the object or a position where the object touches the projection screen according to the light spot,
    wherein the controller is configured to identify the position of the object or the position where the object touches the projection screen and generate a refresh signal according to the same, and the projection optical engine receives the refresh signal and refreshes the projection beam according to the refresh signal.

\* \* \* \* \*